United States Patent
Jang et al.

(10) Patent No.: US 10,883,014 B2
(45) Date of Patent: Jan. 5, 2021

(54) VISIBLE LIGHT CURABLE COATING COMPOSITIONS, ARTICLES, AND PROCESSES OF COATING ARTICLES

(71) Applicant: SDC Technologies, Inc., Irvine, CA (US)

(72) Inventors: James Myoungsouk Jang, Irvine, CA (US); Chandravadan Patel, Brea, CA (US); Erdem Cetin, Irvine, CA (US); Toby Ryan Maguire, Tustin, CA (US); Brett Michael Rambo, Rancho Santa Margarita, CA (US); Ren-Zhi Jin, Irvine, CA (US)

(73) Assignee: SDC TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 16/274,784

(22) Filed: Feb. 13, 2019

(65) Prior Publication Data

US 2019/0264062 A1 Aug. 29, 2019

Related U.S. Application Data

(60) Provisional application No. 62/635,687, filed on Feb. 27, 2018.

(51) Int. Cl.

| | | |
|---|---|---|
| C09D 167/07 | (2006.01) | |
| B05D 3/06 | (2006.01) | |
| B05D 3/10 | (2006.01) | |
| C08K 5/08 | (2006.01) | |
| B05D 1/30 | (2006.01) | |
| B05D 1/28 | (2006.01) | |
| C08K 5/21 | (2006.01) | |
| C08F 22/10 | (2006.01) | |

(52) U.S. Cl.
CPC ........... *C09D 167/07* (2013.01); *B05D 3/067* (2013.01); *B05D 3/101* (2013.01); *B05D 1/28* (2013.01); *B05D 1/30* (2013.01); *B05D 2201/02* (2013.01); *B05D 2350/38* (2013.01); *C08F 22/1006* (2020.02); *C08K 5/08* (2013.01); *C08K 5/21* (2013.01)

(58) Field of Classification Search
CPC ..................................................... C09D 167/07
See application file for complete search history.

(56) References Cited

U.S. PATENT DOCUMENTS

| | | | |
|---|---|---|---|
| 6,534,128 B1 * | 3/2003 | Carlson | C08G 18/68 427/466 |
| 7,915,319 B2 | 3/2011 | Konarski et al. | |
| 9,427,778 B2 | 8/2016 | Ryan | |
| 9,458,335 B1 * | 10/2016 | Sloan | C09D 11/12 |
| 2004/0132862 A1 * | 7/2004 | Woudenberg | C09D 11/34 523/160 |

FOREIGN PATENT DOCUMENTS

| | | |
|---|---|---|
| EP | 3066161 B1 | 7/2017 |
| WO | 2011075550 A3 | 6/2011 |
| WO | 2015000761 A1 | 1/2015 |

* cited by examiner

*Primary Examiner* — Vickey Nerangis
(74) *Attorney, Agent, or Firm* — Calfee, Halter & Griswold LLP

(57) ABSTRACT

Disclosed herein are visible light curable coating compositions that provide transparent and abrasion-resistant coatings when cured on a substrate. The coating compositions comprise a difunctional acrylate monomer, a multifunctional urethane acrylate, a mercapto modified polyester acrylate, an organic solvent, a sole photoinitiator that is activated in the visible range of the electromagnetic spectrum, and optionally, a colloidal silica component. This invention also relates to articles coated with the visible light curable coating compositions of the invention and processes for preparation of such coated polymeric substrates, such as processes for surface restoration of mounted parts, such as surface restoration of automotive headlamps.

21 Claims, 1 Drawing Sheet

VISIBLE LIGHT CURABLE COATING COMPOSITIONS, ARTICLES, AND PROCESSES OF COATING ARTICLES

RELATED APPLICATIONS

This application claims the benefit of and priority to U.S. Provisional Application No. 62/635,687, filed Feb. 27, 2018, which is incorporated herein by reference in its entirety.

FIELD OF THE INVENTION

This invention relates to visible light curable coating compositions that provide transparent and abrasion-resistant coatings on a substrate when cured. This invention also relates to articles coated with the visible light curable coating compositions of the invention and processes for preparation of such coated articles.

BACKGROUND

Transparent plastic materials are frequently used in articles that require visibility and clarity through the materials. Examples of such articles include optical lenses, goggles, face shields, face plates for helmets, industrial lamps, automotive headlamps, architectural glazing used as windows in buildings, and glazing used as windshields or windows in buses, airplanes, and other transportation vehicles. However, transparent plastic materials tend to be soft, and scratch or mar quite easily. Furthermore, some types of transparent plastic materials can be discolored during prolonged exposure to natural weather, which eventually leads to reduced visibility and clarity through the transparent article.

Coatings have been used to help maintain visibility and clarity through transparent plastic materials by providing a clear, protective, abrasion-resistant layer over the substrate. Coatings are also often used for the restoration of optical clarity to damaged surfaces, such as those of automotive headlamps, display screens and windows, appliances, etc., via a process generally referred to as refurbishment. During the refurbishment process, the damaged surface is typically sequentially resurfaced with abrasive materials such as sandpaper and polishing solutions followed by application of a protective, abrasion-resistant coating composition in liquid form, which is then cured to form the solid protective clear coating. The coating components of the composition crosslink during the curing process to harden and form the abrasion-resistant, protective coating. The coatings are typically cured either by exposure to heat, i.e., via thermal cure, or by exposure to ultraviolet (UV) radiation, i.e., via UV radiation cure. The thermal cure process normally takes several hours to complete and necessitates removal of mounted damaged parts from the equipment prior to application. For instance, refurbishing an automotive headlamp with a thermally curable coating requires removal of the headlamp from the vehicle before application of the liquid coating, followed by cure of the liquid coating system, and then re-installment of the headlamp after cure, which is a labor-intensive and expensive process. The UV cure process, while orders of magnitude faster than thermal cure, requires isolation of the part and curing system due to the risk of harmful UV exposure to personnel. UV radiation has a high photon energy range. Overexposure to UV radiation can result in burning of exposed skin and cause serious eye damage. Eye exposure is especially dangerous because the results of overexposure are not immediately evident. Long-term unprotected exposure can lead to partial loss of vision, accelerated skin aging and increased risk of skin cancer.

To circumvent the issue, mounted parts are sometimes coated with UV curable coatings and allowed to cure in direct sunlight for several hours, however, this process results in a cured coating with poor abrasion resistance and weatherability due to non-uniform and inadequate cure.

The visible light curable coating system of the present invention can easily be applied to mounted parts and cured quickly and efficiently to provide abrasion resistance and weatherability, without attendant health and safety risks.

SUMMARY OF THE INVENTION

Disclosed herein are radiation curable compositions capable of being cured by exposure to radiation solely in the visible range of the electromagnetic spectrum that provide abrasion resistance in the cured coating, and a process to use such compositions for plastic substrate application and mounted surface restoration.

In accordance with the invention of the present disclosure, visible light curable coating compositions, application processes that provide transparent and abrasion resistant coatings on a substrate when cured, and cured coated articles, are disclosed herein. The cured coatings also have excellent adhesion to the polymer substrates. In accordance with certain embodiments, the disclosed coating compositions, when cured on a substrate, also provide weatherable coatings.

The visible light curable coating compositions of the invention comprise a difunctional acrylate monomer, a multifunctional urethane acrylate, a mercapto modified polyester acrylate, an organic solvent, and a sole photoinitiator that is activated in the visible range of the electromagnetic spectrum. In certain embodiments, this includes a sole photoinitiator that is activated in the 400 to 700 nm range of the visible electromagnetic spectrum.

In accordance with this disclosure, an article is disclosed. The article comprises a substrate and the coating composition of this disclosure coated on at least one surface of the substrate. The article is preferably prepared by visible light curing of the coating composition on the substrate.

In accordance with this disclosure, processes for preparation of substrate surface and application of the coating compositions of this disclosure are disclosed. The substrate is surfaced, e.g., with abrasive materials and then polished to less than 30% haze. Depending upon the cleanliness of the working environment, an antistatic cleaner solution may optionally be applied to the cleaned substrate before the application of the coating. The coated substrate is preferably cured under visible light.

Other aspects of the present disclosure will be apparent from the description that follows.

DETAILED DESCRIPTION

Figure 1A:
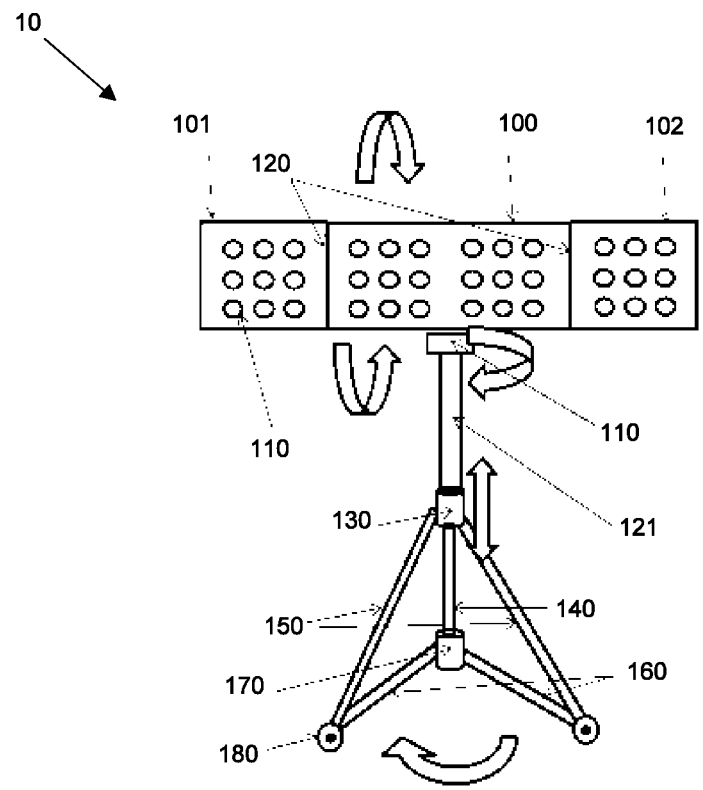
FIG. 1A shows a schematic view of an exemplary LED light stand in accordance with the present disclosure.

Described herein are visible light curable coating compositions and application processes that provide transparent and abrasion resistant coatings on a substrate when cured. In accordance with the embodiments of the present disclosure, the coating compositions comprise a difunctional acrylate monomer, a multifunctional urethane acrylate, a mercapto modified polyester acrylate, an organic solvent, and a single photoinitiator that is activated in the visible range of the electromagnetic spectrum.

The cured coatings produced from the coating compositions disclosed herein are abrasion-resistant. The term "abrasion-resistant," unless otherwise indicated herein, refers to a coating on a substrate that exhibits more resistance to abrasion, e.g., scratching or marring, as compared to the corresponding uncoated substrate. For example, a coating is abrasion-resistant in accordance with this disclosure if a substrate coated with such coating has a lower delta Taber haze, as measured by ASTM D1044 method, as compared to the delta Taber haze of the corresponding uncoated substrate. In general, materials with a higher abrasion resistance possess smaller Taber delta haze than materials with a lower abrasion resistance. The coating compositions disclosed herein, when cured on a substrate, have a smaller delta haze compared to the delta haze of the uncoated substrate, i.e., the cured coatings produced from the coating compositions disclosed herein are abrasion-resistant.

In a preferred embodiment, the cured coatings produced from the coating compositions disclosed herein are also weatherable. The term "weatherable," unless otherwise indicated herein, refers to a coating on a substrate that exhibits more resistance to simulated accelerated weather exposure, e.g., yellowness or Yellow Index (YI) as measured by ASTM G-154 method, as compared to the corresponding uncoated substrate. For example, a coating is weatherable in accordance with this disclosure if a substrate coated with such coating has a lower delta YI after exposure under the simulated accelerated weather condition as compared to the delta YI of the corresponding uncoated substrate. In general, materials with higher weather resistance (weatherability) possess smaller delta YI than materials with lower weatherability. The coating compositions disclosed herein, when cured on a substrate, have a smaller delta YI compared to the delta YI of the corresponding uncoated substrate, i.e., the cured coatings produced from the coating compositions disclosed herein are weatherable.

Unless indicated otherwise, concentrations of coating components are expressed as "weight percent" of the total weight of the liquid coating, i.e., parts by mass of the component per 100 parts by mass of the liquid coating.

Difunctional Acrylate Monomer

The coating compositions disclosed herein include a difunctional acrylate monomer represented by the general formula, $(CH_2=CRC=OOCH_2)_2C_nH_{n+2}$, where R is hydrogen or a methyl group, and n is an integer from 0 to 4. Preferably, n is 2 or 4 and R is hydrogen.

Examples of suitable diacrylate monomers that are used in accordance with this embodiment include, but are not limited to, ethylene glycol diacrylate; ethylene glycol dimethacrylate; propylene glycol diacrylate; 1,4-butanediol diacrylate; 1,4-butanediol dimethacrylate; 1,3-butylene glycol diacrylate and 1,3-butylene glycol dimethacrylate; 1,6-hexanediol diacrylate; 1,6-hexanediol dimethacrylate. 1,4-butanediol diacrylate and 1,6-hexanediol diacrylate are most preferred.

It has been discovered that the use of a difunctional acrylate monomer in the coating compositions disclosed herein improves the adhesion of the cured coating to the substrate. However, the addition of too much of the difunctional acrylate monomer may result in poor clarity of the cured coating. In accordance with certain embodiments, the liquid coating compositions disclosed herein comprise from 1 to 7 weight percent of the difunctional acrylate, preferably from 2 to 6 weight percent of difunctional acrylate, most preferably from 3 to 5 weight percent of difunctional acrylate.

Multifunctional Urethane Acrylate

The coating compositions disclosed herein include a multifunctional urethane acrylate. In certain embodiments, the coating compositions disclosed herein include more than one multifunctional urethane acrylate. As defined herein, one molecule of a multifunctional urethane acrylate contains two (2) or greater acrylate functionalities. Each of the urethane acrylates that collectively form the multifunctional acrylate component is characterized by the occurrence of one or more urethane groups represented by the formula —RN(C=O)O—, where R is hydrogen, alkyl, or aryl group.

Suitable types of multifunctional urethane acrylates include, but are not limited to, urethane diacrylates, urethane triacrylates, urethane tetraacrylates, urethane pentaacrylates, urethane hexaacrylates, and the like. In accordance with certain embodiments, the multifunctional urethane acrylate can be an aromatic urethane acrylate, aliphatic urethane acrylate, or a combination thereof. In accordance with certain embodiments, aromatic urethane acrylates are used alone or in combination with aliphatic urethane acrylates as the multifunctional urethane acrylate in the coating compositions disclosed herein. Preferably, in accordance with this and other embodiments, the aliphatic urethane acrylates are aliphatic urethane hexaacrylates.

In accordance with the embodiments of the coating compositions described herein, the multifunctional urethane acrylate has an acrylate functionality ranging from 2 to 30, preferably ranging from 2 to 10, most preferably 2 to 6.

Multifunctional acrylated allophanates are a certain type of multifunctional urethane acrylate. The multifunctional acrylated allophanate contains two (2) or greater acrylate functionalities in one (1) molecule in accordance with the definition of multifunctional acrylate previously disclosed herein. The multifunctional acrylated allophanate is characterized by the occurrence of allophanate groups represented by the formula below. $R_1$, $R_2$, $R_3$ can be hydrogen, acrylate group or acrylated allophanate group. They may be the same or different. The multifunctional acrylated allophanates are commercially available from Allnex.

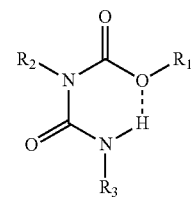

In accordance with certain embodiments of the coating compositions disclosed herein, if a single type of acrylated allophanate is present in the multifunctional acrylated allophanate component, the single type of acrylated allophanate present has an acrylate functionality of two (2) or greater. Suitable types of multifunctional acrylated allophanates include one or more of, but are not limited to, allophanate diacrylates, allophanate triacrylates, allophanate tetraacrylates, allophanate pentaacrylates, allophanate hexaacrylates, and the like. The multifunctional acrylated allophanate used in coating compositions of the present disclosure can include more than one type of acrylated allophanate. Preferably, in accordance with this and other embodiments, the acrylated allophanates include aliphatic acrylated allophanates.

In accordance with all embodiments of the coating compositions described herein, the multifunctional acrylated allophanate component has an acrylate functionality ranging from 2 to 10, preferably ranging from 3 to 6.

In accordance with certain embodiments, the multifunctional acrylate allophanate is used alone or in combination with another multifunctional urethane acrylate in the coating compositions disclosed herein.

Mercapto Modified Polyester Acrylate

The coating compositions disclosed herein include a mercapto modified polyester acrylate. Exemplary mercapto modified polyester acrylates are ADDITOL LED 01 and EBECRYL LED 02, manufactured by Allnex. The preferred mercapto modified polyester acrylate is EBECRYL LED 02. Mercapto modified polyester acrylates are known to enhance surface cure by mitigating oxygen inhibition during free-radical polymerization process. That is, although the coating compositions are curable without the mercapto modified polyester acrylate component, the inclusion of the mercapto modified polyester acrylate further contributes to, and thus enhances, the degree of cure in the coating surface. In accordance with certain embodiments, the coating compositions disclosed herein that contain mercapto modified polyester acrylate can be cured at low dosage of visible light within a short period of time. Although the addition of the mercapto modified polyester acrylate enhances the surface cure of the coating composition, the addition of too much of the mercapto modified polyester acrylate negatively impacts the abrasion resistance of the cured coating. In accordance with the embodiments disclosed herein, the liquid coating compositions comprise from 1 to 30 weight percent of the mercapto modified polyester acrylate, preferably from 3 to 20 weight percent of mercapto modified polyester acrylate, most preferably from 5 to 15 weight percent of mercapto modified polyester acrylate.

Photoinitiator

The coating compositions of the invention include a sole photoinitiator. Visible light cure compositions are well known, see for instance, U.S. Pat. No. 7,915,319 and WO 2011/075550A2. However, these compositions rely on the use of more than one photoinitiator selected from the group consisting of phosphine oxide type photoinitiators, IRGACURE 819 and DAROCURE TPO available from Ciba Specialty Chemicals being the most common, camphorquinones, metallocenes, thioxanthones, thioxanthenes and ketocoumarin derivatives, wherein a phosphinic intiator is used in combination with at least one non-phosphinic photoinitiator or alternatively, two or more non-phosphinic photoinitiators are used in concert with a hydrogen donor, such as an amine synergist for effective cure of the coating. The radiation curable compositions of the present invention, on the other hand, surprisingly rely on a sole, non-phosphinic photoinitiatior activated by radiation in the visible range for full cure of the coating composition without the use of synergists and/or co-initiators.

The photoinitiator can be added at any point during the preparation of the coating composition. The photoinitiator initiates polymerization and advances the curing (i.e., crosslinking) of the coating composition when the coating composition is exposed to visible light radiation in the 400-700 nm wavelength range, including the 440-500 nm wavelength range. The photoinitiator does this by generating radicals when exposed to the visible light radiation. The radicals, in turn, initiate and advance the polymerization and crosslinking of the coating composition during cure.

Examples of suitable sole visible light radiation sensitive photoinitiators used in the coating compositions of the invention disclosed herein include a single photoinitiator selected from the group of photoinitiators that are activated in the 400-700 nm wavelength range, including the 440-500 nm wavelength range of the electromagnetic spectrum, including but are not limited to, 2-[2-hydroxyethyl(methyl) amino]ethanol anthraquinone; 9,10-Phenanthrenequinone, thioxanthone; ketocoumarin, 5,7-diiodo-3-butoxy-6-fluorone, phenyl-propanedione, camphorquinone, bis(.eta.-5-2, 4-cylcopentadien-1-yl)-bis(2,6-difluoro-3-(1H-pyrrol-1-yl)-phenyl) titanium, (bis-(4-methoxybenzoyl)diethyl germane. The preferred sole photoinitiator is camphorquinone.

Organic Solvent Component

The coating compositions disclosed herein include an organic solvent component as a non-reactive diluent to facilitate preparation and application of the coating composition, and to provide long product shelf life for the coating composition. The organic solvent component comprises one or more organic solvents that are added during the preparation of the coating composition. These one or more organic solvents may be added at different points during the preparation of the coating composition. These one or more organic solvents are added as an individual solvent component or as part of another component. For example, the components used in one of the embodiments of the coating compositions disclosed herein, such as colloidal silica or multifunctional urethane acrylate, may be in a solution, suspension, or dispersed form and consequently contain amounts of organic solvent that are added along with the respective component (e.g., the colloidal silica or the multifunctional urethane acrylate) to the coating composition. In such embodiments, any residual organic solvent present within the components used in the coating composition is considered to be part of the one or more of the organic solvents that collectively form the organic solvent component of the coating composition.

Suitable organic solvents that are used as the organic solvent component in the coating compositions disclosed herein are non-hydrocarbon solvents that include one or more of common alcohol, alcohol ether and ketone solvents, such as denatured ethanol, isopropanol, n-propanol, butanol, methylethylketone, methylisobutyl ketone, diacetone alcohol, propylene glycol 1-methyl ether (PMGE), ethylene glycol monopropyl ether (EP glycol ether), ethylene glycol monobutyl ether (EB glycol ether), and the like.

In accordance with embodiments disclosed herein, an amount of organic solvent is used such that the solids content of the coating composition is less than 60 weight percent of the total coating composition, including less than 50 weight percent. In certain embodiments, the viscosity is less than 20 cP including less than 10 cP. In certain embodiments, the coating composition has a solids content less than 60 weight percent and a viscosity less than 20 cP, including less than 10 cP. In accordance with this embodiment, the coating composition may have a solids content less than 50 weight percent and a viscosity less than 20 cP, including a viscosity less than 10 cP.

Colloidal Silica

In accordance with certain embodiments, the coating compositions of the invention may further comprise colloidal silica. The colloidal silica component comprises one or more types of colloidal silica. Colloidal silica, as used herein, refers to a dispersion of nanoscale, amorphous particles of surface modified silica in a liquid phase. Suitable liquid phases for the colloidal silica component include an organic solvent such as isopropanol, PM glycol ether, EP glycol ether and the like, or a mixture of water and organic solvent. Examples of suitable type of compounds which are used for surface modification of the colloidal silica include, but are not limited to carboxylic acids, alcohols, thioalcohols, amines, isocyanates, and silanes. Surface modified colloidal silicas used in the invention are prepared by known processes, as described, for example, by U.S. Pat. Nos. 5,593,781, 5,910,522, 6,291,070, and 8,388,859. Generally, the silica particles in a colloidal dispersion are spherical or aspherical in nature. In accordance with the embodiments disclosed herein, the one or more colloidal silica used as the colloidal silica component have an amorphous silica content ranging from about 15% to about 60% by weight of colloidal silica, preferably from about 30% to about 50% by weight of colloidal silica; and have a mean particle diameter size of about 1-200 nm, preferably about 2-100 nm, and more preferably about 5-50 nm. Colloidal silica is generally available in acidic or basic form, either of which can be used in the coating compositions disclosed herein.

The colloidal silica, when added to the coating compositions disclosed herein, is considered a filler material. The addition of the colloidal silica to the coating compositions enhances the abrasion resistance of the cured coating. However, it has also been discovered that the use of colloidal silica may adversely impact the coating adhesion. Furthermore, the addition of too much of the colloidal silica negatively impacts film formation of the cured coating. In accordance with the embodiments disclosed herein, when colloidal silica is present, the coating compositions comprise up to about 20 weight percent of amorphous silica, preferably up to about 10 weight percent of amorphous silica, more preferably up to about 5 weight percent of amorphous silica.

Leveling Agents

The coating compositions disclosed herein may optionally include a leveling agent. The leveling agent, which is also known as a flow-control agent or a flow modifier, is incorporated into the coating compositions described herein to spread the coating composition more evenly or levelly on the surface of the substrate and to provide substantially uniform contact between the coating composition and the substrate. The amount of the leveling agent can vary widely but preferably is used in an amount ranging from about 0.1% to about 3% by weight of total solids in the liquid coating composition. Non-limiting examples of such leveling agents include polyethers, silicones, silicone polyethers, fluorosurfactants, polyacrylates, silicone polyacrylates such as silicone hexaacrylate, and fluoro-modified polyacrylates.

Stabilizers

Stabilizers such as UV light stabilizers and anti-oxidants may be optionally added to the coating compositions of the invention to impart increased weatherability and oxidative stability to the cured transparent abrasion-resistant coatings. Examples of suitable UV absorbers that may be used in the coating compositions include, but are not limited to, 2-hydroxy-benzophenones (commercial examples include CHIMASSORB 81 and CHIMASSORB 90, both available from BASF of Germany); 2-(2-hydroxyphenyl)-benzotriazoles (commercial examples include TINUVIN 1130, TINUVIN 384-2, TINUVIN 928, and TINUVIN 900, all from BASF); and 2-hydroxyphenyl-s-triazines (commercial examples include, but are not limited to, TINUVIN 400, TINUVIN 405, both from BASF). Examples of suitable hindered amine light stabilizers (HALS) that may be used in the coating compositions include, but are not limited to, 2,2,6,6-tetramethyl piperidine and its derivatives (commercial examples include TINUVIN 152, TINUVIN 292, both from BASF). Examples of suitable antioxidants that may be used in the coating compositions include, but are not limited to hindered phenols (commercial examples include Irganox 1010, Irganox 1035, both from BASF). One of ordinary skill in the art would recognize the type and amount of such stabilizers to be added to the coating compositions.

Substrates

The coating compositions disclosed herein are applied as a coating to substrate surfaces. A variety of substrates are employed. Among the preferred substrate materials include transparent plastics such as polycarbonate, polarized polycarbonate, polyamide, polyacrylate, poly(methyl)methacrylate, polyvinylchloride, polybisallyl carbonate, polyethylene terephthalate, polyethylene naphthenate, polyurethane, and polythiourethane. Other substrates including various polyolefins, fluorinated polymers, metals and glass, such as soda-lime glass, borosilicate glass, acrylic glass among other types of glass, are used with appropriate pretreatments, if necessary.

Coating Application Process

The visible light curable coating compositions described herein are applied in any suitable manner to a substrate that has been carefully surfaced and cleaned. The compositions of the present disclosure can be applied to the solid substrate by various industrial coating methods, such as flow coating, spray coating, curtain coating, dip coating, spin coating, roll coating, screen printing, inkjet printing, and the like. The coating compositions of the present disclosure can be manually applied to the solid substrate by wiping-on, brushing-on, and the like. The coating compositions are then cured by exposing the coated substrate to visible light radiation, such as that provided by LED lamps, which emit light in the range of wavelength from 400 nm to 800 nm, preferably from 410 nm to 600 nm, more preferably from 440 nm to 500 nm.

A Light Emitting Diode (LED) is a structured crystalline material, which when excited by a suitable electrical current, produces light. The LED lamp includes at least one such LED coupled to a power supply, whereby the lamp delivers a high light output to the composition to be cured. Variations in the specific composition of the LED produce light within different spectral ranges. An exemplary LED lamp for this invention has an emission wavelength of 460±20 nm and intensity of from 200 to 300 mW/cm$^2$ at a distance of from 5 to 10 cm from the LED light source, such as, for example the XYUV-2 UV-LED Curing System available from Shenzhen Height-LED Opto-electronics Technology Co., LTD, Shenzhen, China.

As discussed above, the present disclosure also provides articles, wherein the articles comprise a substrate and a coating formed on at least one surface of the substrate. The coating is formed by curing a coating composition in accordance with the coating compositions disclosed herein on the substrate. While the preferred articles of the present disclosure include the coating disposed directly on the substrate (i.e., without a primer or intermediate layer), one or more primer or other form of intermediate layer may be used between the substrate and the coating composition in all of the articles of the present disclosure.

In accordance with the foregoing and other embodiments, the present disclosure provides articles, wherein the articles comprise a surfaced polymeric substrate and a coating formed on at least one surface of the substrate. In accordance with this and other preceding embodiments, the polymeric substrates are either extruded or molded polycarbonate, such as polycarbonate sheet and automotive headlamp, respectively. The surfaced polymeric substrates used in the invention are prepared by well-known "surfacing" processes in the industry, as described, for example, by U.S. Pat. Nos.

7,404,988, 7,163,446, and 9,427,778. The process for preparing the surface of a bare polycarbonate sheet for coating application comprises the steps of applying a polishing solution to a sponge surface, rubbing the polycarbonate sheet surface with the sponge, and then cleaning the surfaced polycarbonate sheet with deionized (DI) water. The process for surfacing a coated substrate, such as coated polycarbonate sheet or automotive headlamp, comprises the steps of sequentially dry sanding, wet sanding, fine polishing, and cleaning. Optionally, an antistatic cleaner solution may then be applied to the substrate.

The coating compositions are then applied to the thus surfaced substrate surface, for example, by flow coating application or by brush-on application. The coated substrate is subjected to air drying from about 2 minutes to about 25 minutes, preferably from about 3 minutes to about 15 minutes, most preferably from about 5 minutes to about 10 minutes, prior to visible light cure. In accordance with this and other preceding embodiments, the coating compositions disclosed herein are cured by at least 60 seconds of exposure to LED light source with a peak intensity of from about 50 to 300 mW/cm$^2$ at an emission wavelength of 460±20 nm as measured by Gigahertz-Optik X1-1 optometer from Gigahertz-Optik Inc, Newburyport, Mass. The distance of the LED light source to the coated substrate surface is about 1-20 cm, preferably 3-15 cm, more preferably 5-10 cm. The LED light source is either mounted on a movable stand or is hand-held. The film thickness of the coating after cure ranges from 1-15 µm, preferably from 2-13 µm, most preferably from 2-10 µm.

The mounted light stand consists of
(a) A hinged light assembly wherein multiple LED light fixtures containing arrays of LED bulbs are joined by hinges that permit the placement of the multiple LED light fixtures at different angles thus allowing for full curing of coated substrates with complex shapes within a single exposure.
(b) A tripod stand that is portable and preferentially equipped with wheels or glides for ease of maneuverability and transportation, and which can be raised or lowered to desired height.

In a further embodiment, the light assembly is mounted on the tripod stand with a swivel fixture that allows the assembly to pivot and rotate on the stand.

An exemplary design is shown in FIG. 1A, wherein a LED light assembly 10 consists of light fixtures, 101 and 102, attached to a central light fixture, 100, with hinge fixtures 120. Each of three light fixtures contains multiple arrays of LED bulbs 110. The light assembly design with three light fixtures attached by hinges should not be viewed as limiting, as it is easy to envision the attachment of two, four or higher number of light fixtures using a similar apparatus.

Figure 1B:
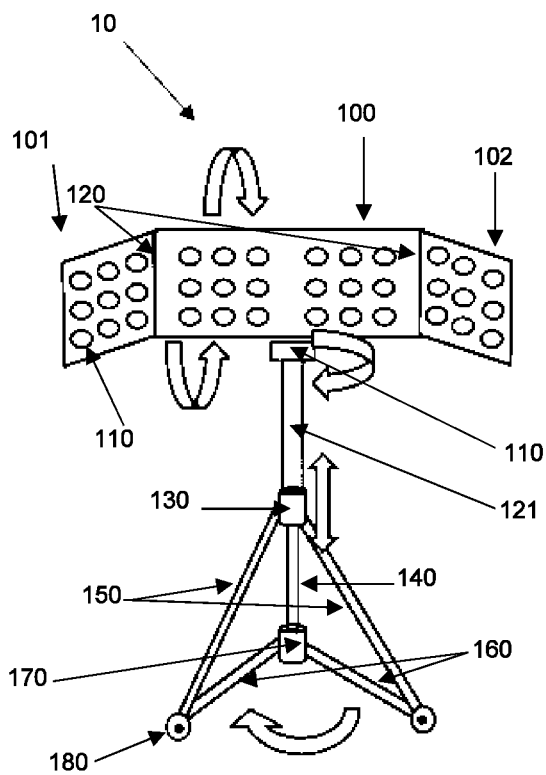
FIG. 1B shows the light stand of FIG. 1A in a different configuration.

The LED light assembly is mounted on a movable tripod stand with a swivel fixture 110 that allows the LED light assembly to pivot back and forth and rotate around the upper stem 121 of the tripod. The upper stem of the tripod is screwed into a chuck sleeve 130 that allows the stem to vertically telescope over the stationary basal stem 140 of the tripod with the aid of leg members, 150, that are hinged to the chuck sleeve and basal leg members, 160. The basal leg members are preferably fixed to the basal fixture, 170, with hinge joints to allow the leg members to be folded for easier storage and portability. The tripod stand is equipped with wheels 180 for ease of maneuverability and transport. FIG. 1B shows the same LED light assembly 10, but with light fixtures 101 and 102 pivoted inward on hinges 120.

The coating compositions disclosed herein are abrasion-resistant, i.e., the cured coating has a lower delta Taber haze, as measured by ASTM D1044 method, as compared to the delta Taber haze of the corresponding uncoated substrate. In general, materials with a higher abrasion resistance possess smaller Taber delta haze than materials with a lower abrasion resistance. In particular, in accordance with certain embodiments, when cured on a polycarbonate substrate, the coatings prepared from the coating compositions disclosed herein exhibit a delta haze after 100 Taber revolutions of less than about 25%, preferably less than about 20%, more preferably less than about 15%, and most preferably less than about 10% after cure. Under the same testing method, the corresponding uncoated polycarbonate sheet exhibits a delta haze after 100 Taber revolutions of about 39%.

Furthermore, in accordance with certain embodiments, as mentioned above, the coating compositions disclosed herein are weatherable. Coatings that are weatherable provide excellent resistance to the damaging effects due to weather, e.g., effects due to rain, temperature, sunlight, etc. Unless otherwise indicated herein, the term "weatherable" refers to a coating composition that exhibits a percent delta haze and YI gain of less than 0.5 when subjected to 240 hours of QUV weather test conditions, as set forth in the Analytical Methods section below. Thus, the coating compositions disclosed herein have percent delta haze and YI gain of less than 0.5, preferably less than 0.3, when subjected to 240 hours of QUV weather test conditions (the delta haze and YI gain being the difference between the haze and YI after exposure to the weather test conditions and the initial haze and YI, respectively). Under the same test condition, the percent delta haze and YI gain of the corresponding uncoated polycarbonate substrate are respectively 0.8 and 0.9.

As used in the description of the invention and the appended claims, the singular forms "a," "an," and "the" are intended to include the plural forms as well, unless the context clearly indicates otherwise.

All references incorporated herein by reference are incorporated in their entirety unless otherwise stated.

The following examples are for purposes of illustration only and are not intended to limit the scope of the claims which are appended hereto.

Tests

A. % Weight Solids

The % weight solids of the liquid coating was calculated by taking the sum of the masses of all the coating components except for water and the organic solvent component, dividing the sum by the total mass of the coating solution, and then multiplying the result by 100.

B. Viscosity

The viscosity of the liquid coating was measured using a Brookfield viscometer Model DV2TLVTJ0 (Ametek Brookfield, Boston, Mass.) at 25° C. and reported in centipoise (cP) units. 16 mL of liquid coating was placed in the ULA-31EY chamber of the viscometer and an ULA-E spindle was used for the viscosity measurement. The viscosity was recorded after the spindle was rotated for 5 min in the range of torque reading between 45 and 95%.

C. Coated Film Thickness

The film thickness of the cured coating was measured with a Filmetrics F20 Thin Film Analyzer (Filmetrics, San Diego, Calif.) and reported in micrometer units.

D. Adhesion

The adhesion was tested using a roll of 3M Brand SCOTCH 600 pressure-sensitive tape. The test was carried out as follows: 1) A 6×6 cross-hatch grid with approximately 2 mm grid spacing was made with a razor blade into the cured coating; 2) A rectangular piece of tape wide enough to fully cover the cross-hatched area but longer than the cross-hatched area was cut and the adhesive side was pressed down firmly over the cross-hatched area using a tongue depressor; 3) After a 90 seconds wait, the long end of the tape was grasped with one hand and pulled rapidly across the cross-hatched area at an angle of ~180° while firmly holding down the specimen with the other hand; 4) A check for the removal of the coating was made by examination of the coated substrate using appropriate visual control; 5) Steps 2, 3 and 4 were repeated two additional times in the same cross-hatched area, each time using a new piece of tape; 6) The subject area was inspected under a microscope; 7) The actual count of unaffected areas was reported as percent adhesion.

E. Haze

Measurements of light transmission and haze of the cured coating were conducted according to ASTM D 1003 with a Haze-gard Plus (BYK-Gardner, Columbia, Md.) hazemeter. The diameter of the testing area was 2.5 cm.

F. Taber Abrasion Resistance

The Taber Abrasion Test of the coated substrate was carried out with a Teledyne Model 5150 Taber Abrader (Taber Industries of North Tonawanda, N.Y.) with a 500 g auxiliary load weight and CS-10F wheels (Taber Industries). Prior to each measurement, the wheels were refaced with the ST-11 refacing stone (Taber Industries). The refacing was performed by 25 revolutions of the CS-10F wheels on the refacing stone. Throughout the testing conducted herein, all of the samples were tested with the same set of CS-10F Taber wheels. The initial haze of the sample was recorded 4 times with a Haze-gard Plus hazemeter equipped with a Taber Abrasion holder. After 100 revolutions of the CS-10F wheels on the sample, the haze was recorded 4 times. Average haze values were calculated for the initial haze reading, and for the haze reading after 100 revolutions. The difference between the average haze reading after 100 revolutions and the average initial haze reading is reported herein as the delta ($\Delta$) Taber Haze.

G. Weatherability and Yellow Index (YI)

The weatherability of the coated substrate was tested on a QUV/SE Accelerated Weathering Tester, supplied by Q-LAB Corporation (Cleveland, Ohio). The procedure of ASTM G-154, a standard practice for operating fluorescent ultraviolet (UV) lamp apparatus for exposure of nonmetallic materials, was followed. The respective length and width dimensions of the specimens were 102 mm and 76 mm. The cycle conditions were as follows: 4 hours of exposure at 70° C. to UV-A lamps at irradiance of 0.68 W/m$^2$ at peak wavelength of 340 nm, followed by 4 hours of condensation at 50° C. The total QUV exposure time was 240 hours. The initial haze and YI were measured prior to the testing, as well as after 240 hours of exposure. The YI was measured on a Shimadzu UV-1601 UV-VIS spectrophotometer (Shimadzu Scientific Instruments of Kyoto, Japan) in accordance with ASTM E-313.

EXAMPLES

Materials Used:

| Abbreviation | Chemical/ Trade Name | Supplier | Description |
| --- | --- | --- | --- |
| EB 5129 | EBECRYL 5129 | Allnex, Alpharetta, GA | Multi-functional Aliphatic Urethane Acrylate |
| EB 220 | EBECRYL 220 | Allnex, Alpharetta, GA | Multi-functional Aromatic Urethane Acrylate |
| EB 4666 | EBECRYL 4666 | Allnex, Alpharetta, GA | Multi-functional Acrylated Allophanate |
| EB LED 02 | EBECRYL LED 02 | Allnex, Alpharetta, GA | Mercapto Modified Polyester Acrylate |
| SR213 | 1,4-butanediol diacrylate | Sartomer Americas, Exton, PA | Difinctional Acrylate monomer |
| SR 238 | 1,6-hexanediol diacrylate (HDDA) | Sartomer Americas, Exton, PA | Difunctional Acrylate monomer |
| M003 | Nanosilica particles (40%) in PM | SDC Technologies, Inc., Irvine, CA | Colloidal Silica |
| PM | Propylene Glycol Monomethyl Ether (PM) | Nexeo Solutions, Dublin, OH | Organic Solvent |
| n-PrOH | n-Propanol | Sigma Aldrich, St. Louis, MO | Organic Solvent |
| n-BuOH | n-Butanol | Ashland chemical Co, Columbus, OH | Organic Solvent |
| CQ | Camphorquinone | Sigma Aldrich, St. Louis, MO | Visible light activated Photoinitiator |
| Irga 819 | IRGACURE 819 | Ciba, Tarrytown, NY | Phosphine oxide, phenylbis(2,4,6-trimethyl benzoyl) Visible light activated Photoinitiator |
| EB 7100 | EBECRYL 7100 | Allnex, Alpharetta, GA | Acrylated Amine Synergist |
| DHEPT | Dihydroxyethyl-p-Toluidine | Esstech, INC., Essington, PA | Amine Synergist |
| T400 | TINUVIN 400 | BASF, Southfield, MI | Hydroxyphenyl-triazine (HPT) UV Absorber |
| BYK 3505 | BYK-UV 3505 (Tripropylene glycol diacrylate) | BYK USA Inc, Wallingford, CT | Leveling Agent |

-continued

| Abbreviation | Chemical/ Trade Name | Supplier | Description |
|---|---|---|---|
| PC | Polycarbonate | Covestro MAKROLON | Bare Polycarbonate Sheet |
| CR-Scrub | CRYSTALCOAT CR-Scrub Plus Lens Abrasive Solution (20% Alumina in Water) | SDC Technologies, Inc., Irvine, CA | Polishing Solution |
| SIMPLE GREEN | SIMPLE GREEN 13005 Industrial Degreaser | Sunshine Makers, Inc., Huntington Harbour, CA | Aqueous Detergent Solution |
| ACL Staticide 8670 | ACL Staticide 8670 Plastic and Glass Cleaner, Aerosol | | Antistatic Cleaner |
| Castle Plexo | CASTLE PLEXO Anti-Static Plastic Glass Cleaner | | Antistatic Cleaner |

Preparation of Substrate Surface

Method A—Surface Preparation of Bare Polycarbonate Sheet

The protective film from one surface of a MAKROLON 4"×4" polycarbonate sheet was removed while the protective film on the other surface of the sheet was retained to protect the back surface of the polycarbonate sheet from scratches. A PSI Soft Buffer Sponges #572 sponge was wet with about 2 g of CR-Scrub polishing solution. The unmasked surface of the polycarbonate sheet was rubbed with the wet sponge for 30-60 seconds. The protective film from the back surface of the sheet was then removed and the entire sheet was cleaned by rinsing with 10% SIMPLE GREEN aqueous detergent solution, then thoroughly rinsed with tap water followed by rinsing with DI water, and then dried with compressed air to obtain a surfaced polycarbonate sheet with haze between about 10% and about 20% on the surfaced side, unless indicated otherwise, as measured by BYK Haze Guard Plus.

Method B—Surface Preparation of Coated Polycarbonate Sheet

The surface of a hard-coated polycarbonate sheet was prepared as follows:

The coated surface was sequentially dry sanded from coarse to fine grit using an orbital sander with Sungold 5" disc abrasive sandpapers P220, P320, P500, and P600 available from Sungold Abrasive USA Inc, Port Washington, N.Y. The sanding time for each sandpaper was about 2-3 minutes. At the end of each dry sanding cycle, the substrate was washed with tap water and dried with compressed air before switching to the next sandpaper. After the dry sanding step, the haze on the polycarbonate sheet substrate was around 80-90% as measured by BYK Haze Guard Plus.

The dry sanded substrate was then subjected to sequential wet sanding from coarse to fine grit using an orbital sander with Red Label 5" disc abrasive sandpapers P800, P1500, and P2000 available from Red Label Abrasives Belding, Mich. The sanding time for each sandpaper was about 2-3 minutes. At the end of each wet sanding cycle, the substrate was washed with tap water and dried with a wipe cloth before switching to the next sandpaper. After the wet sanding step, the haze on the wet sanded polycarbonate sheet substrate was around 60-70% as measured by BYK Haze Guard Plus.

The wet sanded substrate was further polished with CR-Scrub polishing solution by wetting a PSI Soft Buffer Sponges #572 sponge available from Look To PSI, Odessa, Fla., with around 5 g of the CR-Scrub polishing solution, placing the wet sponge in an orbital sander, and polishing the wet sanded substrate for about 2-3 minutes.

The polished surface was then cleaned by washing with 10% SIMPLE GREEN aqueous detergent solution, followed by tap water and DI water washes, and then dried with a microfiber wipe cloth to obtain a polished substrate with a haze about 10-30% as measured by BYK Haze Guard Plus.

An antistatic cleaner solution was applied to the polished surface with a lint-free cloth.

The substrate was allowed to stand at ambient conditions for about 30-60 seconds before coating application.

Method C—Surface Preparation of Headlamp

The surface of a hard-coated polycarbonate headlamp was prepared as follows:

The area around the headlamp was masked off with a paint-safe temporary tape to protect the paint on the car. A collection vessel was placed under the headlamp to collect excess cleaning materials and coating.

The coated surface was sequentially dry sanded from coarse to fine grit using an orbital sander with Sungold 5" disc abrasive sandpapers P220, P320, P500, and P600. The sanding time for each sandpaper was about 2-3 minutes. At the end of each dry sanding cycle, the headlamp was washed with tap water from a squeeze bottle and dried with a wipe cloth before switching to the next sandpaper.

The dry sanded headlamp was then subjected to sequential wet sanding from coarse to fine grit using an orbital sander with Red Label 5" disc abrasive sandpapers P800, P1500, and P2000. The sanding time for each sandpaper was about 2-3 minutes. At the end of each wet sanding cycle, the headlamp was washed with tap water from a squeeze bottle and dried with a wipe cloth before switching to the next sandpaper.

The wet sanded headlamp was further polished with CR-Scrub polishing solution by wetting a PSI Soft Buffer Sponges #572 sponge with around 5 g of the CR-Scrub polishing solution, placing the wet sponge in an orbital sander, and polishing the wet sanded headlamp for about 2-3 minutes.

The polished surface was then cleaned by washing with 10% SIMPLE GREEN aqueous detergent solution using a scratch free wash cloth, followed by tap water and DI water washes from a squeeze bottle, and then dried with a microfiber wipe cloth.

An antistatic cleaner solution was applied to the polished surface with a lint-free cloth.

The headlamp was allowed to stand at ambient conditions for about 30-60 seconds before coating application.

Coating Application

A. Flow Coating Application

Coating compositions were applied by the flow coating method using a 25 mL plastic pipette. The procedure was as follows: A surfaced and cleaned 10 cm×10 cm polycarbonate sheet was suspended vertically on a lab scaffold. A rectangular catching basin was placed below the polycarbonate sheet to collect any drips from the sheet during the flow coating. About 25 mL of the coating composition of the invention was drawn into the pipette. The coating was applied by continuously squeezing the pipette starting from the bottom left corner of the polycarbonate sheet, vertically upwards towards the upper left corner, horizontally across to the upper right corner, and then all the way down to the bottom right corner of the sheet, allowing the coating to gravitationally flow from top to bottom of the sheet surface. The coated polycarbonate sheet was allowed to air dry for about 5-10 minutes before LED cure.

B. Brush-on Application

The coating composition was brushed on using a common flexible polyurethane foam brush. The polyurethane foam brush was dipped into a coating composition of the invention for about 2-5 seconds. Any excess coating was removed by gently brushing against the wall of the coating container. The coating was then brushed onto a surfaced and cleaned polycarbonate sheet as well as a surfaced and cleaned headlamp in a single horizontal motion with a slight overlap between each brush stroke in order to cover the whole surface of the substrate. The coated substrates were allowed to air dry for about 8-10 minutes before LED cure.

LED Light Cure

A. LED Light Source Mounted on a Movable Stand

The coated substrate was cured by LED light source with a peak emission wavelength of 460±20 nm that was mounted on a movable stand. The height and angle of the LED light source were adjusted using the movable stand to ensure full coverage of the entire coated sample. The LED light source was positioned at a distance of about 5-10 cm from the coated substrate. The intensity of the LED light source at this distance was about 200 to 300 mW/cm$^2$ as measured by a Gigahertz-Optik X1-1 optometer from Gigahertz-Optik Inc, Newburyport, Mass. The coated substrate was cured by the LED light source for at least 1 minute and for up to 10 minutes.

B. Hand-Held LED Light Source

The size of the LED light source used was about 15 cm×15 cm. The coated substrate was placed on a benchtop in a stationary condition. The LED light source with a peak emission wavelength of 460±20 nm was held at a distance of about 5-10 cm from the coated substrate. The intensity of the LED light source at this distance was about 200 to 300 mW/cm$^2$ as measured by a Gigahertz-Optik X1-1 optometer from Gigahertz-Optik Inc, Newburyport, Mass. The coated substrate was cured by the LED light source in a sweeping back and forth motion through about a 20 cm to 30 cm wide arc for a total of five cycles. In the case of an automotive headlamp with a size of 15 cm×30 cm, the exposure time of each cycle was about 60 seconds in one direction with 2 seconds duration in the returning direction back to home position. The total exposure time of the coated headlamp was about 5 minutes.

Examples of Coating Compositions

Example 1

A mixture of 6.0 g of EB 5129, 6.0 g of EB 4666, 6.0 g of EB LED 02, and 62.4 g of PM was stirred at room temperature in a plastic beaker for 0.5 hours. Then, 12.2 g of M003 and 5.0 g of SR213 were added to the mixture and stirred for another 0.5 hours, followed by an addition of 2.3 g of CQ and 0.1 g of BYK 3505. The plastic beaker was covered with aluminum foil, and the resulting mixture was stirred at room temperature for 4 hours and then filtered through a 1.2 μm filter.

Examples 2-13 and Comparative Examples C1-C14 were prepared using the preparation method of Example 1 using the ingredients and their corresponding quantities shown in Tables 1a through 1d.

TABLE 1a

Coating compositions of Invention Examples 1-7

| Ingredient | Example 1 | Example 2 | Example 3 | Example 4 | Example 5 | Example 6 | Example 7 |
|---|---|---|---|---|---|---|---|
| EB 5129 | 6.0 | 7.7 | 6.0 | 3.0 | | 12.0 | 5.0 |
| EB 4666 | 6.0 | 7.7 | 6.0 | 6.0 | 6.0 | | 5.0 |
| EB LED 02 | 6.0 | 7.7 | 6.0 | 6.0 | 6.0 | 6.0 | 20.0 |
| EB 220 | | | | 3.0 | 6.0 | | |
| PM | 62.4 | 69.5 | 60.9 | 62.4 | 62.4 | 62.4 | 51.3 |
| n-PrOH | | | | | | | |
| n-BuOH | | | | | | | |
| M003 | 12.2 | | 12.2 | 12.2 | 12.2 | 12.2 | 12.2 |
| SR 213 | 5.0 | 5.0 | 5.0 | 5.0 | 5.0 | 5.0 | 4.1 |
| SR 238 (HDDA) | | | | | | | |
| CQ | 2.3 | 2.3 | 2.3 | 2.3 | 2.3 | 2.3 | 2.3 |
| BYK 3505 | 0.1 | 0.1 | 0.1 | 0.1 | 0.1 | 0.1 | 0.1 |
| T400 | | | 1.5 | | | | |

TABLE 1b

Coating compositions of Invention Examples 8-13

| Ingredient | Example 8 | Example 9 | Example 10 | Example 11 | Example 12 | Example 13 |
|---|---|---|---|---|---|---|
| EB 5129 |  | 6.0 | 6.0 | 6.0 | 6.0 | 4.2 |
| EB 4666 | 12.0 | 6.0 | 6.0 | 6.0 | 6.0 | 4.2 |
| EB LED 02 | 6.0 | 6.0 | 6.0 | 6.0 | 6.0 | 30.0 |
| EB 220 |  |  |  |  |  |  |
| PM | 62.4 | 62.4 | 32.4 | 32.4 | 62.5 | 43.5 |
| n-PrOH |  |  | 30.0 |  |  |  |
| n-BuOH |  |  |  | 30.0 |  |  |
| M003 | 12.2 | 12.2 | 12.2 | 12.2 | 12.2 | 12.2 |
| SR 213 | 5.0 |  | 5.0 | 5.0 | 5.0 | 3.6 |
| SR 238 (HDDA) |  | 5.0 |  |  |  |  |
| CQ | 2.3 | 2.3 | 2.3 | 2.3 | 2.3 | 2.3 |
| BYK 3505 T400 | 0.1 | 0.1 | 0.1 | 0.1 |  | 0.1 |

TABLE 1c

Coating compositions of Comparative Examples C1-C6

| Ingredient | Comparative C1 | Comparative C2 | Comparative C3 | Comparative C4 | Comparative C5 | Comparative C6 |
|---|---|---|---|---|---|---|
| EB 5129 |  | 3.4 | 28.0 |  |  | 14.0 |
| EB 4666 |  | 3.4 |  | 28.0 | 23.0 | 14.0 |
| EB LED 02 | 28.0 | 40.0 |  |  |  |  |
| EB 220 |  |  |  |  |  |  |
| PM | 69.6 | 35.7 | 69.6 | 69.6 | 62.4 | 69.6 |
| n-PrOH |  |  |  |  |  |  |
| n-BuOH |  |  |  |  |  |  |
| M003 |  | 12.2 |  |  | 12.2 |  |
| SR 213 |  | 2.9 |  |  |  |  |
| SR 238 (HDDA) |  |  |  |  |  |  |
| CQ | 2.3 | 2.3 | 2.3 | 2.3 | 2.3 | 2.3 |
| BYK 3505 T400 | 0.1 | 0.1 | 0.1 | 0.1 | 0.1 | 0.1 |

TABLE 1d

Coating compositions of Comparative Examples C7-C12

| Ingredient | Comparative C7 | Comparative C8 | Comparative C9 | Comparative C10 | Comparative C11 | Comparative C12 |
|---|---|---|---|---|---|---|
| EB 5129 | 23.0 |  | 7.7 | 9.3 | 9.0 | 5.2 |
| EB 4666 |  | 14.0 | 7.7 | 9.3 | 9.0 | 5.2 |
| EB LED 02 |  | 14.0 | 7.7 | 9.3 |  | 5.2 |
| EB 220 |  |  |  |  |  |  |
| PM | 62.4 | 69.6 | 62.3 | 69.7 | 62.4 | 62.3 |
| n-PrOH |  |  |  |  |  |  |
| n-BuOH |  |  |  |  |  |  |
| M003 | 12.2 |  | 12.2 |  | 12.2 | 12.2 |
| SR 213 |  |  |  |  | 5.0 | 7.5 |
| SR 238 (HDDA) |  |  |  |  |  |  |
| CQ | 2.3 | 2.3 | 2.3 | 2.3 | 2.3 | 2.3 |
| BYK 3505 T400 | 0.1 | 0.1 | 0.1 | 0.1 | 0.1 | 0.1 |

TABLE 1e

Coating compositions of Comparative Examples C13-C14

| Ingredient | Comparative C13 | Comparative C14 |
|---|---|---|
| EB 5129 | 4.4 | 2.3 |
| EB 4666 | 4.4 | 2.3 |
| EB LED 02 | 4.4 | 6.0 |
| EB 220 | | |
| PM | 62.2 | 24.1 |
| n-PrOH | | |
| n-BuOH | | |
| M003 | 12.2 | 61.0 |
| SR213 | 10.0 | 1.9 |
| SR 238 (HDDA) | | |
| CQ | 2.3 | 2.3 |
| BYK 3505 | 0.1 | 0.1 |
| T400 | | |

Each of the coating compositions from Tables 1a-1d was applied by flow coating on a 10 cm×10 cm bare polycarbonate sheet that had been surfaced using Method A. The coated sheet was air dried for 10 minutes before curing at an intensity of 200 mW/cm$^2$ for 60 seconds under the LED light source that was placed at a distance of about 10 cm from the coated sheet.

The physical properties of the coated sheets and uncoated polycarbonate sheet are listed in Table 2a-2e.

TABLE 2a

Performance of Coatings - Invention Examples 1-7

| | Example 1 | Example 2 | Example 3 | Example 4 | Example 5 | Example 6 | Example 7 |
|---|---|---|---|---|---|---|---|
| Bare surfaced substrate haze (%) | 16.8 | 14.7 | 17.2 | 15.3 | 14.9 | 13.8 | 15.6 |
| Liquid Coating Properties | | | | | | | |
| % Weight Solids | 30.3 | 30.5 | 31.8 | 30.3 | 30.3 | 30.3 | 41.4 |
| Viscosity (cP) | 4.5 | 4.8 | 4.6 | 4.8 | 5.2 | 4.6 | 6.1 |
| Cured Coating Properties | | | | | | | |
| Coating Appearance | Good | Good | Good | Good | Good | Good | Good |
| Tack-free after cure | Yes | Yes | Yes | Yes | Yes | Yes | Yes |
| Coating Thickness (micrometer) | 3.2-5.7 | 3.9-6.2 | 3.4-5.9 | 3.7-6.9 | 3.8-6.5 | 2.9-5.3 | 5.7-10.5 |
| Haze (%) | 0.5 | 0.4 | 0.6 | 0.4 | 0.4 | 0.4 | 0.5 |
| YI | 1.1 | 1.1 | 1.2 | 1.0 | 1.0 | 0.9 | 1.5 |
| Cross-hatch Adhesion (%) | 100 | 100 | 100 | 100 | 100 | 100 | 100 |
| Δ Taber haze (100 rev) (%) | 6.4 | 21.7 | 13.3 | 7.4 | 8.5 | 5.8 | 8.0 |
| ΔHaze after 240 h QUV (%) | 0.1 | 0.1 | 0.1 | 0.2 | 0.2 | 0.1 | 0.1 |
| ΔYI after 240 h QUV | 0.3 | 0.2 | 0.1 | 0.3 | 0.3 | 0.1 | 0.5 |

TABLE 2b

Performance of Coatings - Invention Examples 7-13 and Uncoated PC Reference (Control)

| | Example 8 | Example 9 | Example 10 | Example 11 | Example 12 | Example 13 | Control |
|---|---|---|---|---|---|---|---|
| Bare surfaced substrate haze (%) | 18.8 | 12.9 | 15.5 | 16.4 | 17.6 | 14.8 | |
| Liquid Coating Properties | | | | | | | |
| % Weight Solids | 30.3 | 30.3 | 30.3 | 30.3 | 30.2 | 49.2 | |
| Viscosity (cP) | 4.9 | 5.1 | 4.1 | 4.4 | 4.4 | 8.2 | |
| Cured Coating Properties | | | | | | | |
| Coating Appearance | Good | Good | Good | Good | Good | Good | |
| Tack-free after cure | Yes | Yes | Yes | Yes | Yes | Yes | |
| Coating Thickness (micrometer) | 3.2-6.1 | 3.7-6.5 | 3.5-6.1 | 2.4-4.9 | 3.1-5.6 | 7.4-13.5 | |

TABLE 2b-continued

Performance of Coatings - Invention Examples 7-13 and Uncoated PC Reference (Control)

|  | Example 8 | Example 9 | Example 10 | Example 11 | Example 12 | Example 13 | Control |
|---|---|---|---|---|---|---|---|
| Haze (%) | 0.6 | 0.4 | 0.4 | 0.5 | 0.6 | 0.6 | 0.3 |
| YI | 1.5 | 0.8 | 0.9 | 0.8 | 1.4 | 1.8 | 0.8 |
| Cross-hatch Adhesion (%) | 100 | 100 | 100 | 100 | 100 | 100 | |
| Δ Taber haze (100 rev) (%) | 7.7 | 7.6 | 5.9 | 6.8 | 6.4 | 9.2 | 39 |
| ΔHaze after 240 h QUV (%) | 0.1 | 0.1 | 0.1 | 0.1 | 0.1 | 0.2 | 0.8 |
| ΔYI after 240 h QUV | 0.4 | 0.2 | 0.3 | 0.2 | 0.3 | 0.6 | 0.9 |

TABLE 2c

Performance of Coatings - Comparative Examples C1-C6

|  | Comparative C1 | Comparative C2 | Comparative C3 | Comparative C4 | Comparative C5 | Comparative C6 |
|---|---|---|---|---|---|---|
| Bare surfaced substrate haze (%) | 14.6 | 15.2 | 13.4 | 16.6 | 15.8 | 17.2 |
| Liquid Coating Properties | | | | | | |
| % Weight Solids | 30.4 | 57.0 | 30.4 | 30.4 | 30.3 | 30.4 |
| Viscosity (cP) | 3.9 | 11.5 | 5.8 | 7.6 | 6.1 | 6.6 |
| Cured Coating Properties | | | | | | |
| Coating Appearance | Poor-wet | Poor-wet | Good | Good | Good | Good |
| Tack-free after cure | No | No | Yes | Yes | Yes | Yes |
| Coating Thickness (micrometer) | | | 4.4-6.2 | 4.5-7.7 | 4.2-6.5 | 3.6-7.1 |
| Haze (%) | | | 0.5 | 0.6 | 2.5 | 0.5 |
| YI | | | 1.5 | 1.4 | 3.6 | 1.6 |
| Cross-hatch Adhesion (%) | | | 0 | 0 | 0 | 0 |
| Δ Taber haze (100 rev) (%) | | | 23.4 | 35.8 | 11.9 | 28.2 |
| ΔHaze after 240 h QUV (%) | | | 0.1 | 0.1 | 1.5 | 0.2 |
| ΔYI after 240 h QUV | | | 0.1 | 0.2 | 0.2 | 0.2 |

TABLE 2d

Performance of Coatings - Comparative Examples C7-C12

|  | Comparative C7 | Comparative C8 | Comparative C9 | Comparative C10 | Comparative C11 | Comparative C12 |
|---|---|---|---|---|---|---|
| Bare surfaced substrate haze (%) | 14.6 | 13.4 | 15.8 | 16.4 | 17.6 | 13.2 |
| Liquid Coating Properties | | | | | | |
| % Weight Solids | 30.3 | 30.4 | 30.4 | 30.3 | 30.3 | 30.4 |
| Viscosity (cP) | 5.5 | 5.4 | 5.1 | 5.8 | 4.6 | 4.4 |
| Cured Coating Properties | | | | | | |
| Coating Appearance | Good | Good | Good | Good | Good | Good |
| Tack-free after cure | Yes | Yes | Yes | Yes | Yes | Yes |
| Coating Thickness (micrometer) | 3.5-5.9 | 3.5-6.1 | 3.3-5.7 | 4.1-6.2 | 3.3-5.4 | 3.2-6.2 |
| Haze (%) | 0.5 | 0.4 | 0.5 | 0.4 | 1.2 | 1.2 |
| YI | 1.6 | 1.5 | 1.5 | 1.1 | 1.5 | 1.4 |

TABLE 2d-continued

Performance of Coatings - Comparative Examples C7-C12

| | Comparative C7 | Comparative C8 | Comparative C9 | Comparative C10 | Comparative C11 | Comparative C12 |
|---|---|---|---|---|---|---|
| Cross-hatch Adhesion (%) | 0 | 50 | 10 | 10 | 100 | 100 |
| Δ Taber haze (100 rev) (%) | Not tested | Not tested | Not tested | Not tested | Not tested | Not tested |
| ΔHaze after 240 h QUV (%) | Not tested | Not tested | Not tested | Not tested | Not tested | Not tested |
| ΔYI after 240 h QUV | Not tested | Not tested | Not tested | Not tested | Not tested | Not tested |

TABLE 2e

Performance of Coatings - Comparative Examples C13-C14

| | Comparative C13 | Comparative C14 |
|---|---|---|
| Bare surfaced substrate haze (%) | 16.8 | 14.7 |
| Liquid Coating Properties | | |
| % Weight Solids | 30.5 | 39.3 |
| Viscosity (cP) | 4.3 | 7.2 |
| Cured Coating Properties | | |
| Coating Appearance | Good | Good |
| Tack-free after cure | Yes | Yes |
| Coating Thickness (micrometer) | 2.5-6.1 | 4.4-7.6 |
| Haze (%) | 2.5 | 0.4 |
| YI | 2.3 | 1.0 |
| Cross-hatch Adhesion (%) | 100 | 25 |
| Δ Taber haze (100 rev) (%) | Not tested | Not tested |
| Δ Haze after 240 h QUV (%) | Not tested | Not tested |
| Δ YI after 240 h QUV | Not tested | Not tested |

As shown in Tables 2a and 2b, all of the cured Invention Examples 1-13 applied to bare surfaced substrates with haze less than 20% exhibited good appearance, tack-free cure, and 100% adhesion to the polycarbonate substrate and less than 1% haze under the test conditions. In contrast, Comparative Example C1 and C2, which contained either only mercapto modified polyester acrylate or greater than 30% of mercapto modified polyester acrylate did not exhibit tack-free cure, i.e., the coating was still wet and tacky to the touch after cure. Comparative Examples C3, C4, C5, C6 and C7, which contained only multifunctional urethane acrylate exhibited tack-free cure but poor adhesion. In the case of Comparable Example C5, the cured coating even showed high haze. Comparative Examples C8, C9 and C10, which contained only multifunctional urethane acrylate and mercapto modified polyester acrylate but no diacrylate monomer, exhibited tack-free cure but poor adhesion. Comparative Example C11, which contained only multifunctional urethane acrylate and diacrylate monomer but no mercapto modified polyester acrylate, exhibited tack-free cure and 100% adhesion but high haze. Comparative Examples C12 and C13, which contained multifunctional urethane acrylate, mercapto modified polyester acrylate, but greater than 5% of diacrylate monomer, exhibited tack-free cure and 100% adhesion but high haze. Comparative Example C14, which contained multifunctional urethane acrylate, mercapto modified polyester acrylate, less than 5% of diacrylate monomer but greater than 20% of silica, exhibited tack-free cure but poor adhesion.

Furthermore, all of the cured Invention Examples 1-13 exhibited a delta Taber haze of less than 25% after 100 revolutions. In contrast, the uncoated polycarbonate sheet showed a delta Taber haze of 39% after 100 revolutions. The delta haze and YI for the coated sheets of the cured Invention Examples 1-13 after 240 hours of QUV exposure ranged from 0.1-0.2% and 0.1-0.4, respectively. In contrast, the corresponding delta haze and YI values for an uncoated polycarbonate sheet were 0.8% and 0.9, respectively. Thus, the cured coatings of the Invention Examples are abrasion resistant and weatherable compared to the uncoated substrate.

Comparative Example C15

A mixture of 6.0 g of EB 5129, 6.0 g of EB 4666, 6.0 g of EB LED 02, and 57.8 g of PM was stirred at room temperature in a plastic beaker for 0.5 hours. Then, 12.2 g of M003 and 5.0 g of SR213 were added to the mixture and stirred for another 0.5 hours, followed by an addition of 2.3 g of CQ, 4.6 g of EB7100, and 0.1 g of BYK 3505. The plastic beaker was covered with aluminum foil, and the resulting mixture was stirred at room temperature for 4 hours and then filtered through a 1.2 μm filter.

Comparative Examples C16-C17 were prepared using the preparation method of Comparative Example 15 using the ingredients and their corresponding quantities shown in Table 3.

TABLE 3

Coating Compositions of Comparative Examples C15-C17

| | Comparative C15 | Comparative C16 | Comparative C17 |
|---|---|---|---|
| EB5129 | 6.0 | 6.0 | 6.0 |
| EB 4666 | 6.0 | 6.0 | 6.0 |
| EB LED 02 | 6.0 | 6.0 | 6.0 |
| PM | 57.8 | 57.8 | 62.4 |
| M003 | 12.2 | 12.2 | 12.2 |
| SR213 | 5.0 | 5.0 | 5.0 |
| CQ | 2.3 | 2.3 | |
| EB7100 | 4.6 | | |
| DHEPT | | 4.6 | |
| Irga 819 | | | 2.3 |
| BYK3505 | 0.1 | 0.1 | 0.1 |

Each of the comparative coating compositions from Table 3 was applied by flow coating on a 10 cm×10 cm bare polycarbonate sheet that had been surfaced using Method A. The coated sheet was air dried for 10 minutes before curing at an intensity of 200 mW/cm$^2$ for 60 seconds under the LED light source that was placed at a distance of about 10 cm from the coated sheet.

The physical properties of the coated sheets are listed in Table 4.

TABLE 4

Performance of Comparative Examples C15-C17

|  | Comparative C15 | Comparative C16 | Comparative C17 |
|---|---|---|---|
| Bare surfaced substrate | 14.1 | 15.6 | 14.8 |
| Liquid Coating Properties | | | |
| % Weight Solids | 34.9 | 34.9 | 30.3 |
| Viscosity (cP) | 6.7 | 5.2 | 4.6 |
| Cured Coating Properties | | | |
| Tack-free after cure | Yes | No | Yes |
| Coating Thickness (micrometer) | 4.9-8.7 | Not Tested | 4.1-6.9 |
| Haze (%) | 1.0 | Not Tested | 0.6 |
| YI | 1.2 | Not Tested | 1.1 |
| Cross-hatch Adhesion (%) | 100 | Not Tested | 50 |

As shown above in Tables 2a and 2b, all of the Invention Examples 1-13, which used camphorquinone as the sole photoinitiator, exhibited tack-free cure and 100% adhesion to the polycarbonate substrate and less than 1% haze under the test conditions. In contrast, Comparative Examples C15-16, which contained camphorquinone and amine synergist as a co-initiator, exhibited either tack-free cure but high haze, or undercure. Comparative Example C17, which contained phosphine oxide as sole photoinitiator, showed tack-free cure but poor adhesion.

Comparative Example C18-C22

Comparative Examples C18-C22 were prepared using the preparation method of Example 1 using the ingredients and their corresponding quantities shown in Tables 5.

TABLE 5

Coating Compositions of Comparative Examples C18-C22

| Ingredient | Comparative C18 | Comparative C19 | Comparative C20 | Comparative C21 | Comparative C22 |
|---|---|---|---|---|---|
| EB 5129 | 18.2 | 22.8 | 21.0 | 36.4 | |
| EB 4666 | 18.2 | 22.8 | 21.0 | | 31.0 |
| EB LED 02 | 18.2 | 22.8 | 21.0 | 18.2 | 15.5 |
| PM | 25.8 | 12.0 | 29.6 | 25.8 | 33.9 |
| M003 | 12.2 | 12.2 | | 12.2 | 12.2 |
| SR 213 | 5.0 | 5.0 | 5.0 | 5.0 | 5.0 |
| CQ | 2.3 | 2.3 | 2.3 | 2.3 | 2.3 |
| BYK 3505 | 0.1 | 0.1 | 0.1 | 0.1 | 0.1 |

Each of the comparative coating compositions from Table 5 was applied by flow coating on a 10 cm×10 cm bare polycarbonate sheet that had been surfaced using Method A. The coated sheet was air dried for 10 minutes before curing at an intensity of 200 mW/cm$^2$ for 3 minutes under the LED light source that was placed at a distance of about 10 cm from the coated sheet.

The physical properties of the coated sheets are listed in Table 6.

TABLE 6

Performance of Coatings - Comparative Examples C18-C22

| | Comparative C18 | Comparative C19 | Comparative C20 | Comparative C21 | Comparative C22 |
|---|---|---|---|---|---|
| Bare surfaced substrate haze (%) | 15.2 | 14.5 | 13.7 | 14.1 | 14.6 |
| Liquid Coating Properties | | | | | |
| % Weight Solids | 66.9 | 80.7 | 70.4 | 66.9 | 58.8 |
| Viscosity (cP) | 43.0 | 168.6 | 46.9 | 29.1 | 25.9 |
| Cured Coating Properties | | | | | |
| Coating appearance | Poor - high haze | Unable to coat | Poor - uneven flow | Poor - uneven flow | Poor - high haze, uneven flow |
| Tack-free after cure | Yes | | Yes | Yes | Yes |
| Coating Thickness (micrometer) | 21.8-39.7 | | 18.1-36.6 | 13.4-28.2 | 14.1-26.9 |
| Haze (%) | 4.9 | | 0.5 | 0.5 | 8.4 |
| YI | 4.3 | | 1.2 | 1.1 | 5.8 |
| Cross-hatch Adhesion (%) | 99 | | 99 | 99 | 100 |
| Δ Taber haze (100 rev) (%) | Not tested | | 17.7 | 4.6 | Not tested |

As shown above in Tables 2a and 2b, all of the Invention Examples 1-13, which have % solids below 50% and viscosity less than 10 cP, exhibited good cured coating appearance and less than 1% haze under the test conditions. In contrast, substrates coated with Comparative Examples C18-C22, which have % solids more than 58% and viscosity greater than 25 cP, exhibited high haze and/or uneven coating appearance.

Coating Application Process

Invention Examples 14-23 and Comparative Examples C23-C24

The composition of Example 1 was applied on a 10 cm×10 cm bare surfaced polycarbonate sheet (Method A) by flow coating. The coated sheet was air dried for 10 minutes before being cured under the LED light source at varying distances from the coated sheet and at varying intensities and for varying durations, and the physical properties of the cured coatings measured as shown in Tables 7a and 7b.

source, the weaker the intensity. Examples 14-23, which were cured under the conditions of exposure time ranging from about 1 to about 10 minutes at a distance of coated substrate to LED light source of about 3 to about 15 cm (corresponding to at a light intensity ranging from about 100 to about 300 mW/cm$^2$), resulted in tack-free cure with 100% adhesion and less than 1% of haze. In contrast, Comparative Example C23, which was cured under the condition of exposure time of 30 seconds at a distance of coated substrate to LED light source of about 10 cm (corresponding to a light intensity of 200 mW/cm$^2$) did not exhibit tack-free cure. Comparative Example C24, which was cured under the condition of exposure time of 10 minutes at a distance of coated substrate to LED light source of about 20 cm (corresponding to a light intensity of 50 mW/cm$^2$) did not have a 100% adhesion. Thus, the preferred cure condition for the coating composition under the LED light source is a distance of the coated substrate to the LED light source of less than about 20 cm, preferably between about 5 and about 10 cm, TABLE 7a Curing Conditions vs. Coating Performance

|  | Example 14 | Example 15 | Example 16 | Comparative C23 | Example 17 |
|---|---|---|---|---|---|
| Distance to LED source (cm) |  | 5 |  |  | 10 |
| Light intensity (mW/cm$^2$) |  | 300 |  |  | 200 |
| Exposure time (Minute) | 1 | 3 | 5 | 0.5 | 1 |
| Tack-free after cure | Yes | Yes | Yes | No | Yes |
| Haze (%) | 0.9 | 0.9 | 0.9 |  | 0.5 |
| Coating Thickness (micrometer) | 3.1-5.1 | 3.3-5.6 | 3.2-5.1 |  | 3.2-5.7 |
| YI | 1.2 | 1.4 | 1.3 |  | 1.1 |
| Cross-hatch Adhesion (%) | 100 | 100 | 100 |  | 100 |
| Δ Taber haze (100 rev) (%) | 4.1 | 3.7 | 4.1 |  | 6.4 |

TABLE 7b

Curing Conditions vs. Coating Performance

|  | Example 18 | Example 19 | Example 20 | Example 21 | Example 22 | Example 23 | Comparative C24 |
|---|---|---|---|---|---|---|---|
| Distance to LED source (cm) |  | 10 |  |  | 15 |  | 20 |
| Intensity (mW/cm$^2$) |  | 200 |  |  | 100 |  | 50 |
| Exposure time (Minute) | 3 | 5 | 10 | 1 | 3 | 5 | 10 |
| Tack-free after cure | Yes | Yes | Yes | Yes | Yes | Yes | Yes |
| Haze (%) | 0.5 | 0.7 | 0.5 | 0.8 | 0.7 | 0.9 | 0.5 |
| Coating Thickness (micrometer) | 3.2-5.3 | 3.1-5.3 | 3.4-5.6 | 3.3-5.8 | 2.9-5.5 | 3.2-5.3 | 3.5-6.4 |
| YI | 0.9 | 1.2 | 0.9 | 1.4 | 1.1 | 1.4 | 1.2 |
| Cross-hatch Adhesion (%) | 100 | 100 | 100 | 100 | 100 | 100 | 98 |
| Δ Taber haze (100 rev) (%) | 4.1 | 4.6 | 5.2 | 13.0 | 4.8 | 5.3 |  |

As shown in Tables 7a and 7b above, the intensity of the LED light source and the exposure time affects the degree of cure of the coating compositions. A short period of exposure time and low intensity of LED light source results in poorer abrasion resistance of the cured coating composition. The intensity of the LED light source is inversely proportional to the distance of the coated substrate to LED light source. The farther the distance of the coated substrate to LED light source, the weaker the intensity.

and an exposure time of less than about 10 minutes, preferably from about 1 to about 3 minutes.

Example 24-26 and Comparative Example C25-C26

The composition of Example 1 was applied on a 10 cm×10 cm bare surfaced polycarbonate sheet (Method A) by flow coating. The coated sheet was air dried for varying durations before curing for 3 minutes under the LED light source placed about 10 cm from the coated sheet at a corresponding lamp intensity of 200 mW/cm².

The physical properties of the coated sheets are listed in Table 8.

TABLE 8

Air dry time vs. Coating Performance

| | Comparative C25 | Example 24 | Example 25 | Example 26 | Comparative C26 |
|---|---|---|---|---|---|
| Air dry time | 1 min | 5 min | 10 min | 20 min | 30 min |
| Tack-free after cure | No | Yes | Yes | Yes | Yes |
| Coating Thickness (micrometer) | | 3.3-6.2 | 3.2-5.3 | 3.1-5.8 | 3.1-5.6 |
| Haze (%) | | 0.6 | 0.5 | 0.5 | 0.5 |
| YI | | 1.1 | 0.9 | 0.8 | 0.8 |
| Cross-hatch Adhesion (%) | | 100 | 100 | 100 | 99 |
| Δ Taber haze (100 rev) (%) | | 7.5 | 4.1 | 5.4 | 5.4 |

As shown in Table 8 above, air dry time of the coated substrate affects the cure of the coating composition. Example 24-26, wherein the coated substrates were air dried for about 5-20 minutes, exhibited tack-free cure, 100% adhesion and less than 1% haze. In contrast, Comparative Examples C25 and C26, which were air dried for less than 5 minutes and more than 25 minutes, respectively, did not exhibit either tack-free cure or perfect adhesion. Thus, the preferred air dry time of the coating compositions is from about 5 to about 20 minutes.

Examples 27-28 and Comparative Example C27-C30

10 cm×10 cm bare polycarbonate substrates were surfaced for different durations using Method A followed by application of the composition of Example 1 using flow coating and brush-on application methods. The coated substrates were air dried for 10 minutes before curing for 3 minutes under the LED light source placed about 10 cm from the coated substrates, corresponding to a light intensity of 200 mW/cm².

The physical properties of the coated sheets are listed in Table 9.

bare substrate, which subsequently resulted in higher haze of the coated substrate. Short surfacing times yielding less than about 5% haze in the bare substrate resulted in poor adhesion of the cured coating. Examples 27-28, wherein the bare substrates were surfaced to a level of haze between about 10 and about 20%, exhibited less than 1% of haze after cure.

Examples 29-30, wherein the haze of the bare substrates after surfacing was between about 20% and about 30%, exhibited greater than 1% but less than 2% haze after cure. However, Examples 27-30 all exhibited 100% adhesion of the cured coating, regardless of the coating application method. In contrast, Comparative Examples C27 and C28, wherein the haze of the bare substrates after surfacing and cleaning was less than 5% exhibited poor adhesion of the cured coating regardless of the coating application method used.

Examples 31-32

10 cm×10 cm bare polycarbonate substrates were surfaced using Method B followed by coating with the composition of Example 1 using flow coating and brush-on application methods. The coated substrates were air dried for 10 minutes before curing for 3 minutes under the LED light source placed about 10 cm from the coated substrates, corresponding to a light intensity of 200 mW/cm².

The physical properties of the coated sheets are listed in Table 10. Both samples exhibited a bare surfaced substrate haze of about 25% and a resultant cured coated substrate

TABLE 9

Surfacing Method A and Coating Performance

| | Example 27 | Example 28 | Example 29 | Example 30 | Comparative C27 | Comparative C28 |
|---|---|---|---|---|---|---|
| Surfacing Duration (min) | 1 | 1 | 3 | 3 | <0.5 | <0.5 |
| Bare surface substrate haze (%) | 13.8 | 15.2 | 22.8 | 27.6 | 3.4 | 3.9 |
| Method of application | Flow | Brush-on | Flow | Brush-on | Flow | Brush-on |
| Tack-free after cure | Yes | Yes | Yes | Yes | Yes | Yes |
| Coating Thickness (micrometer) | 3.2-5.3 | 3.4 | 3.3-5.9 | 3.8 | 3.2-5.9 | 3.2 |
| Haze (%) | 0.5 | 0.6 | 1.2 | 1.6 | 0.3 | 0.3 |
| YI | 0.9 | 1.2 | 1.7 | 1.7 | 1.0 | 0.9 |
| Cross-hatch Adhesion (%) | 100 | 100 | 100 | 100 | 90 | 95 |

As shown in table 9 above, the adhesion and haze of the cured coating are related to the degree of surfacing of the substrate. Longer surfacing times showed higher haze of the haze of greater than 1% and less than 2%. Both coated samples exhibited 100% adhesion after cure, regardless of the coating application method.

TABLE 10

Surfacing Method B and Coating Performance

|  | Example 31 | Example 32 |
|---|---|---|
| Bare surfaced substrate haze (%) | 25.4 | 25 |
| Method of application | Flow | Brush-on |
| Tack-free after cure | Yes | Yes |
| Coating Thickness (micrometer) | 3.1-5.7 | 3.1 |
| Haze (%) | 1.8 | 1.7 |
| YI | 2.2 | 1.8 |
| Cross-hatch Adhesion (%) | 100 | 100 |

Examples 33-35

A 10 cm×10 cm bare polycarbonate sheet was surfaced using Method B and treated with or without an antistatic cleaner solution before applying the coating composition of Example 1 by brush-on application method. The coated sheet was air dried for 10 minutes before curing for 3 minutes under the LED light source placed at a distance of about 10 cm from the coated substrate (corresponding to a light intensity of 200 mW/cm$^2$).

The physical properties of the coated sheets are listed in Table 11. In addition, the cured coated sheets were visually checked over the 10 cm×10 cm area for particles greater than 0.5 mm in size using a Bulbtronics LIQCX75 arc lamp (Bulbtronics, Burbank, Calif.), and the particle counts reported in Table 11.

TABLE 11

Antistatic Cleaner Solution vs. Coating Performance

|  | Example 33 | Example 34 | Example 35 |
|---|---|---|---|
| Antistatic Cleaner | None | ACL Staticide 8670 | Castle Plexo |
| Tack-free after cure | Yes | Yes | Yes |
| Haze (%) | 1.8 | 1.7 | 1.8 |
| Coating Thickness (micrometer) | 3.9 | 3.8 | 3.2 |
| YI | 1.7 | 1.8 | 1.8 |
| Cross-hatch Adhesion (%) | 100 | 100 | 100 |
| Particles on cured sheet | 35 particles | 25 particles | 10 particles |

As shown in table 11 above, the use of an antistatic cleaner solution does not affect the performance of the cured coating composition. The cured coating composition adhered well to the surfaced sheet both with and without treatment with a layer of antistatic cleaner solution. The application of antistatic cleaner solution to the surfaced polycarbonate sheet improved the appearance of the cured sheet as fewer particles were observed on the cured coated sheet that had been pre-treated with an antistatic cleaner solution.

Example 36

A 15 cm×30 cm polycarbonate headlamp was surfaced and cleaned using surfacing Method C, followed by coating with the composition of Example 1 by brush-on application method. The coated headlamp was air dried for 10 minutes before curing under the hand-held LED light source positioned about 10 cm from the coated headlamp (corresponding to a light intensity of 200 mW/cm$^2$) for a total of 5 cycles with a total exposure time of 5 minutes and 10 seconds, resulting in a clear, tack-free cured coating with 100% adhesion to the surfaced polycarbonate headlamp.

What is claimed is:

1. A coating composition which provides a transparent and abrasion-resistant coating when cured by visible light, the coating composition comprising:
    a. a difunctional acrylate;
    b. a multifunctional urethane acrylate;
    c. a mercapto modified polyester acrylate;
    d. an organic solvent; and
    e. a photoinitiator that is activated in the visible range of the electromagnetic spectrum,
    wherein the photoinitiator is a sole photoinitiator in the coating composition,
    wherein, when cured on a polycarbonate substrate, the coating exhibits a delta haze of less than about 25% after 100 Taber revolutions.

2. The composition of claim 1, wherein the composition comprises from 1 to 7 weight percent of the difunctional acrylate.

3. The composition of claim 1, wherein the difunctional acrylate is selected from 1,4-butanediol diacrylate and 1,6-hexanediol diacrylate.

4. The composition of claim 1, wherein the multifunctional urethane acrylate has an acrylate functionality ranging from 2 to 10.

5. The composition of claim 1, wherein the multifunctional urethane acrylate is a multifunctional acrylated allophanate with an acrylate functionality ranging from 2 to 10.

6. The composition of claim 1, wherein the multifunctional urethane acrylate is an aliphatic urethane acrylate, an aromatic urethane acrylate, or a combination thereof.

7. The composition of claim 1, wherein the composition comprises from 1 to 30 weight percent of the mercapto modified polyester acrylate.

8. The composition of claim 1, wherein the solids content is less than 60% and the viscosity is less than 20 cP at 25° C.

9. The composition of claim 1, wherein the photoinitiator is activated by exposure to radiation in the 400 to 500 nm wavelength range of the electromagnetic spectrum.

10. The composition of claim 9, wherein the photoinitiator is camphorquinone.

11. The composition of claim 1, wherein a substrate coated with the transparent and abrasion-resistant coating has a smaller delta Taber haze compared to the delta Taber haze of the corresponding uncoated substrate.

12. An article, comprising:
    a substrate and a coating formed on at least one surface of said substrate by visible light curing of a coating composition, the coating composition comprising:
    a. a difunctional acrylate;
    b. a multifunctional urethane acrylate;
    c. a mercapto modified polyester acrylate;
    d. an organic solvent; and
    e. a photoinitiator that is activated in the visible range of the electromagnetic spectrum,
    wherein the photoinitiator is a sole photoinitiator in the coating composition,
    wherein, when cured on a polycarbonate substrate, the coating exhibits a delta haze of less than about 25% after 100 Taber revolutions.

13. The article of claim 12, wherein the substrate is a surfaced polymeric substrate.

14. The article of claim 13, wherein the polymeric substrate is extruded or molded polycarbonate.

15. The article of claim 14, wherein the polymeric substrate is an automotive polycarbonate headlamp.

16. The article of claim 12, wherein no primer is disposed between the substrate and the coating.

17. The article of claim 12, wherein the film thickness of the cured coating is between 1 and 15 µm.

18. The article of claim 14, wherein the article is abrasion-resistant and weatherable.

19. A process for preparing a coated article comprising steps of:
   a. surfacing a polymeric substrate,
   b. optionally applying an antistatic cleaning solution to the surfaced polymeric substrate,
   c. applying a coating composition to the surfaced substrate comprising:
      i. a difunctional acrylate;
      ii. a multifunctional urethane acrylate;
      iii. a mercapto modified polyester acrylate;
      iv. an organic solvent; and
      v. a photoinitiator that is activated in the visible range of the electromagnetic spectrum, and
   d. curing the coating composition with visible light,
   wherein the photoinitiator is a sole photoinitiator in the coating composition,
   wherein, when cured on a polycarbonate substrate, the coating exhibits a delta haze of less than about 25% after 100 Taber revolutions.

20. The process of claim 19, wherein the coating composition is cured by exposure to radiation with wavelengths in the 400 to 500 nm range of the electromagnetic spectrum.

21. The process of claim 20, wherein the radiation is visible light generated by an LED light source with peak emission wavelength of 460±20 nm and intensity of from 200 to 300 mW/cm$^2$ at a distance of from 1 to 20 cm from the LED light source.

* * * * *